United States Patent [19]

Kawata et al.

[11] Patent Number: 4,870,590
[45] Date of Patent: Sep. 26, 1989

[54] MANUFACTURING LINE CONTROL SYSTEM

[75] Inventors: Yasunori Kawata; Fujio Kanno, both of Tokyo, Japan

[73] Assignee: Yokogawa Electric Corporation, Tokyo, Japan

[21] Appl. No.: 146,941

[22] Filed: Jan. 22, 1988

[30] Foreign Application Priority Data

Jan. 30, 1987 [JP] Japan .................................. 62-20176

[51] Int. Cl.[4] ............................................ G06F 15/46
[52] U.S. Cl. .................................. 364/468; 364/131; 364/478; 364/513; 364/200; 364/222.6; 364/226.7; 364/900; 364/921.4; 901/7
[58] Field of Search ............... 364/132, 148, 468, 513, 364/200, 900, 300, 474.11, 131, 478, 138; 901/9, 44, 47, 7; 318/568

[56] References Cited

U.S. PATENT DOCUMENTS

| | | | |
|---|---|---|---|
| 4,344,146 | 8/1982 | Davis, Jr. et al. | 901/44 |
| 4,472,783 | 9/1984 | Johnstone et al. | 364/468 |
| 4,604,718 | 8/1986 | Norman et al. | 364/468 |
| 4,628,435 | 12/1986 | Tashiro et al. | 364/468 |
| 4,630,216 | 12/1986 | Tyler et al. | 364/468 |
| 4,633,392 | 12/1986 | Vincent et al. | 364/200 |

Primary Examiner—Joseph Ruggiero
Attorney, Agent, or Firm—Moonray Kojima

[57] ABSTRACT

A manufacturing line control system wherein the hardware region of a main memory is divided on basis of different pieces of information to be stored, the main memory being in a CPU board within a line computer which synthetically judges and processes data transmitted from a manufacturing line; and access control portions are disposed on each of the regions for performing high speed access upon instruction of identical page by a microprocessor. Various analog signal, digital signal and status signal issued from a product passing through the manufacturing line are inputted from the line computer into various equipment installed on the manufacturing line, and control signals are transmitted to the various equipment by a line controller including an input-output portion with which a plurality of card equipment is detachably provided for the application of various types of manufacturing line. The system achieves automation at the manufacturing line site, reduces power consumption, stabilizes manufacturing at high quality, enables efficient small scale manufacture of many different types of products and enhances operability.

16 Claims, 18 Drawing Sheets

| ST 01 | | 01 | 02 | 03 | 04 | 05 | 06 |
|---|---|---|---|---|---|---|---|
| Symbol | | 1 | 1 | 2 | | | 2 |
| DI 0801 | Start Button | Y | | Y | | | |
| DI 0802 | Switch A | N | Y | Y | | | |
| DR 015<2000 | | | | | Y | | |
| | | | | | | | |
| | | | | | | | |
| DO 0701 | Valve B | Y | N | | | | |
| CT 015PS=100 | | | | Y | | | |
| | | | | | | | |
| | | | | | | | |
| Next Step | Then | | | 2 | 1 | | |
| | Else | | | | | | |

MANUFACTURING LINE CONTROL SYSTEM

BACKGROUND OF THE INVENTION

1. Field of Invention

This invention relates to a manufacturing line control system for controlling a slave side manufacturing line by use of a host computer system in a factory automation grade; and more particularly, to a manufacturing line control system for performing automation manufacturing line site, power saving production and stabilized manufacture of high quality products, and for improving workability, and for producing small amounts of different types of products.

2. Description of the Prior Art

FIGS. 1, 2 and 3 are schematic illustrations of robot systems used in conventional manufacturing line control systems. Various types of robot systems are used for producing various kinds of products. It has been an important technical task to achieve free and efficient operation of such types of robots in manufacturing lines.

The conventional system shown in FIG. 1 is provided with a kernel computer 1, a keyboard 2 as a man-machine interface, an input-output device for a CRT (cathode ray tube) 2, manipulation device 4, and an input-output terminal 5 for connecting associated devices. Computer 1 supplies control signals to servo controllers $6_1$–$6_n$ whose numbers correspond to articulation numbers of the robot in order to operate arm 7 of the robot. Further, in order to provide a high quality robot, whose operation simulates human labor, there are requisite functions such as the provision of two components for arm 7, and determination of operation by processing signals sent from a visual sensor such as a TV camera.

The system shown in FIG. 1 provides a kernel computer 1 which performs the latter function. However, in the robot system, computer 1 must perform several tens of thousands of operations per second with respect to data defined by cartesian coordinates, and accordingly, the computer is subjected to heavy load for simultaneously performing a plurality of operations of the arms, and picture image processing.

FIGS. 2 and 3 are illustrations of other conventional systems in which improvements have been made to overcome the drawbacks attendant to the FIG. 1 system. The system shown in FIG. 2 comprises a computer 1a exclusively used to operate arm 7 of a robot, a picture image processing system 1b which processes signals sent from a visual sensor 8, and a commercially available transmission line RS232C connecting computer 1a and image processing system 1b.

The system shown in FIG. 3 comprises a host computer 1, processors 1a,1b exclusively used to operate arms 7 of a robot, processors 1a, 1b being subordinate relative to computer 1, picture image processors 1c,1d for processing signals sent from visual sensors 8.

However, these conventional systems have been developed in connection with numerical control machine tools, and accordingly, these systems are incapable of performing highly cooperative operation. Furthermore, with these conventional systems, it is difficult to rapidly adjust the systems to handle different types of products passing through the manufacturing line, and to handle frequent changes of manufacturing products. That is, it would be difficult for the conventional computer, wherein simple processing such as numerical control can only be made, to conduct efficient operation, since voluminous information from the manufacturing line must be concurrently processed so as to handle the frequent changes in working conditions and in manufacturing products.

Moreover, it is necessary to process the information from the manufacturing line at high speeds, and to perform high speed processing within the computer in order to enhance the computer's operational speed. Also, there is required improvement in memory access which is frequently conducted.

SUMMARY OF THE INVENTION

It is therefore an object of the invention to overcome the aforementioned and other drawbacks and disadvantages and deficiencies of the prior art.

Another object is to provide an improved manufacturing line control system which is capable of promptly meeting frequent changes in working conditions and frequent changes of manufacturing products.

A further object is to provide such a system which can carry out automation of manufacturing line site, achieve power savings, provide stabilized manufacture of high quality products, improve workability and enable efficient manufacture of small amounts of different types of products.

A still further object is to provide such a system which is capable of simultaneously processing voluminous information from the manufacturing line in accordance with frequent changes in working conditions and in types of products.

A yet further object is to attain high speed operation of the computer so as to perform high speed processing of information sent from the manufacturing line, and to improve memory access within the computer.

The foregoing and other objects, features and advantages are attained by the invention which, briefly, improves the main memory access of the central processing unit (CPU)board in a line computer, exclusive of data processing, and hardware regions of the main memory being divided into a plurality of regions in response to stored information, and access control units being provided for the respective divided regions for high speed access. Also, between the line computer and the various devices disposed on the manufacturing line, a line controller is provided as card units so as to carry out plug-in and plug-out signal input-output portions, to thereby receive various kinds of signals sent from the manufacturing products passing through the manufacturing line, to satisfy different requirements of different manufacturing lines.

DETAILED DESCRIPTION OF PREFERRED EMBODIMENTS

Figure 1:
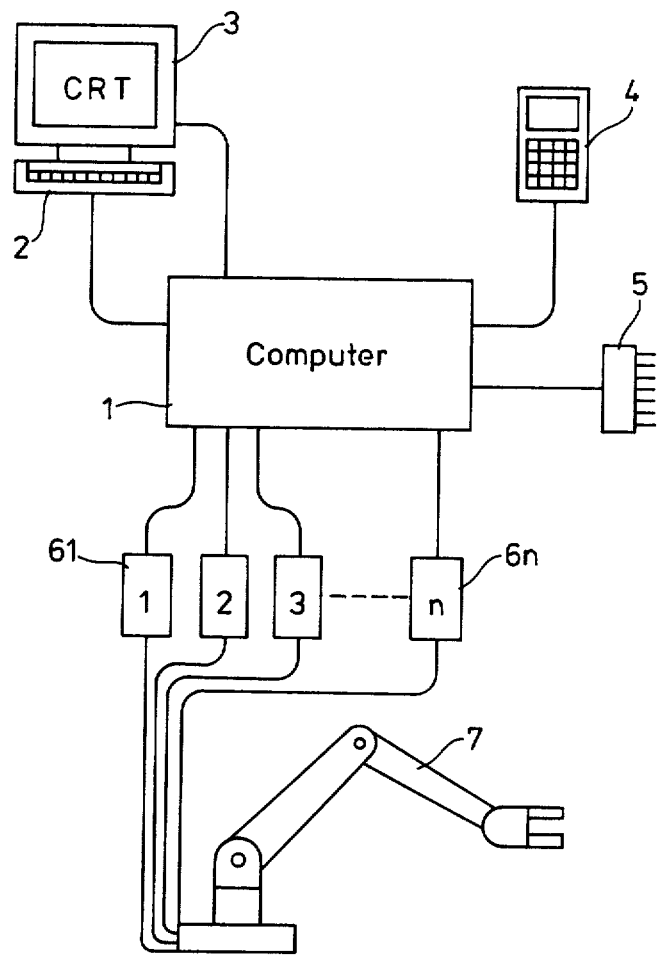
FIGS. 1, 2 and 3 are schematic illustrations depicting conventional manufacturing line control systems.
Figure 2:
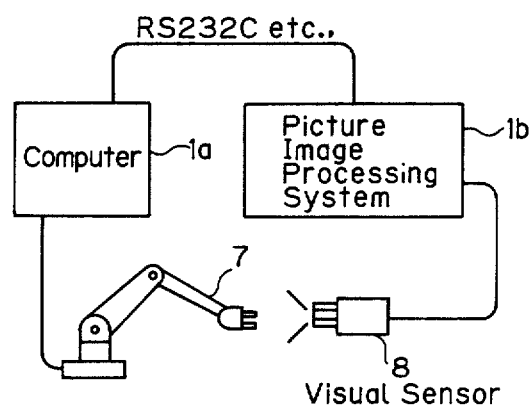
Figure 3:
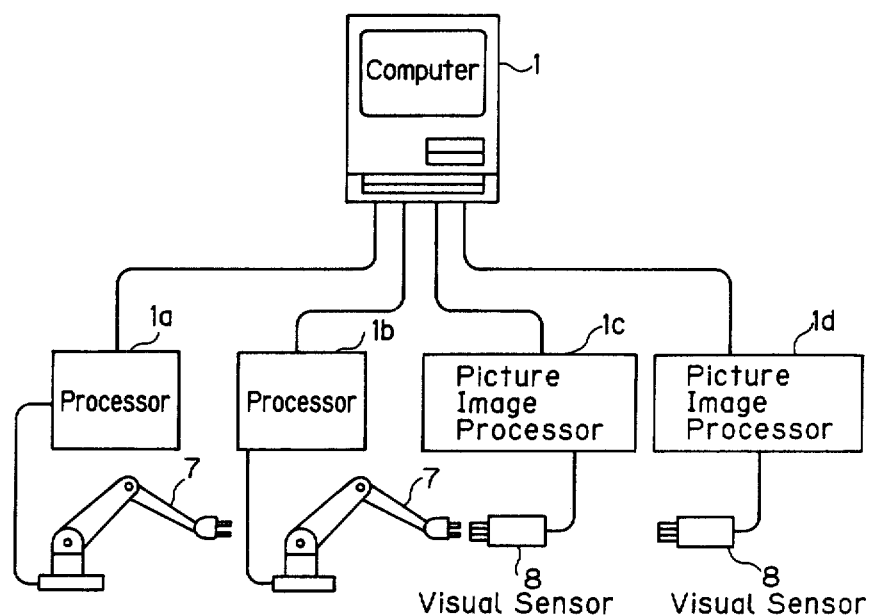
Figure 4:
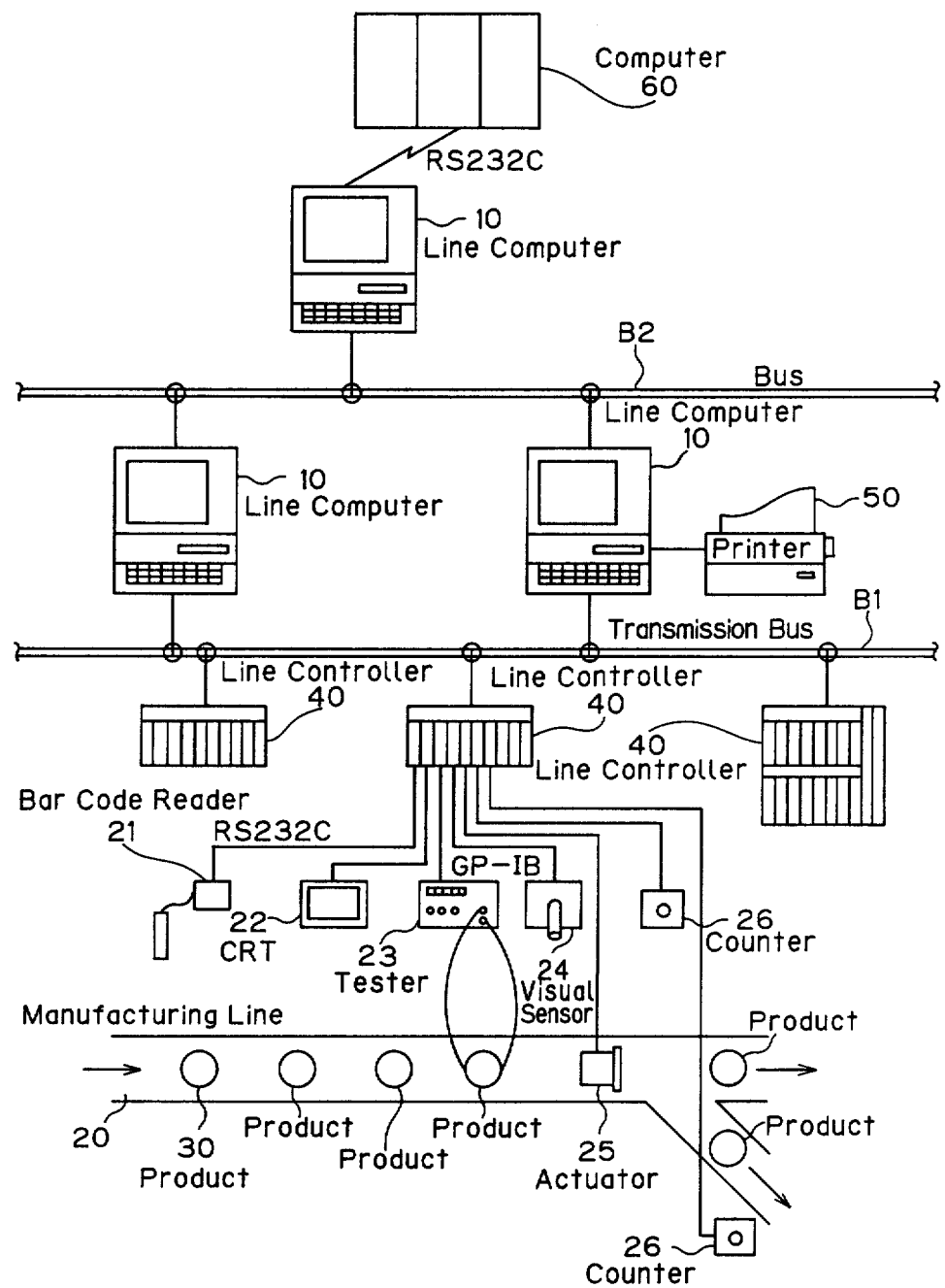
FIG. 4 is a schematic view depicting an illustrative embodiment of the invention and showing the manufacturing line control systems.

Turning now to FIG. 4, a line computer 10 is connected to a transmission bus B1 to which a line controller 40 is connected. Computer 10 performs various processing functions with respect to products 30 passing through manufacturing line 20.

Computer 10 gathers data from line controller 40 and sends instructions thereto. Computer 10 also outputs data from line controller 40, if desired for booking through a printer 50. Computer 10, connected to bus B2, is disposed at, for example, a central control room, and can communicate with other line computers 10, with the host side intermediate or large scale computer 60 for sending information as to the state of the manufacturing line 20 by way of ordinary transmission standard signal line, such as RS232C.

Controller 40 directly controls the operations of a bar code reader 21, which reads out, through RS232C, a product code of product 30 passing through manufacturing line 20, i.e. an automatic inspection line; CRT 22 which displays output results; a tester 23, such as an electrical voltage tester, for testing an operation of product 30 through GP-IB line; a visual sensor 24 for external appearance test; an actuator 25 for selecting good or inferior products in response to output signal from visual sensor 24; and a counter 26 for counting the good or inferior product.

Figure 5:
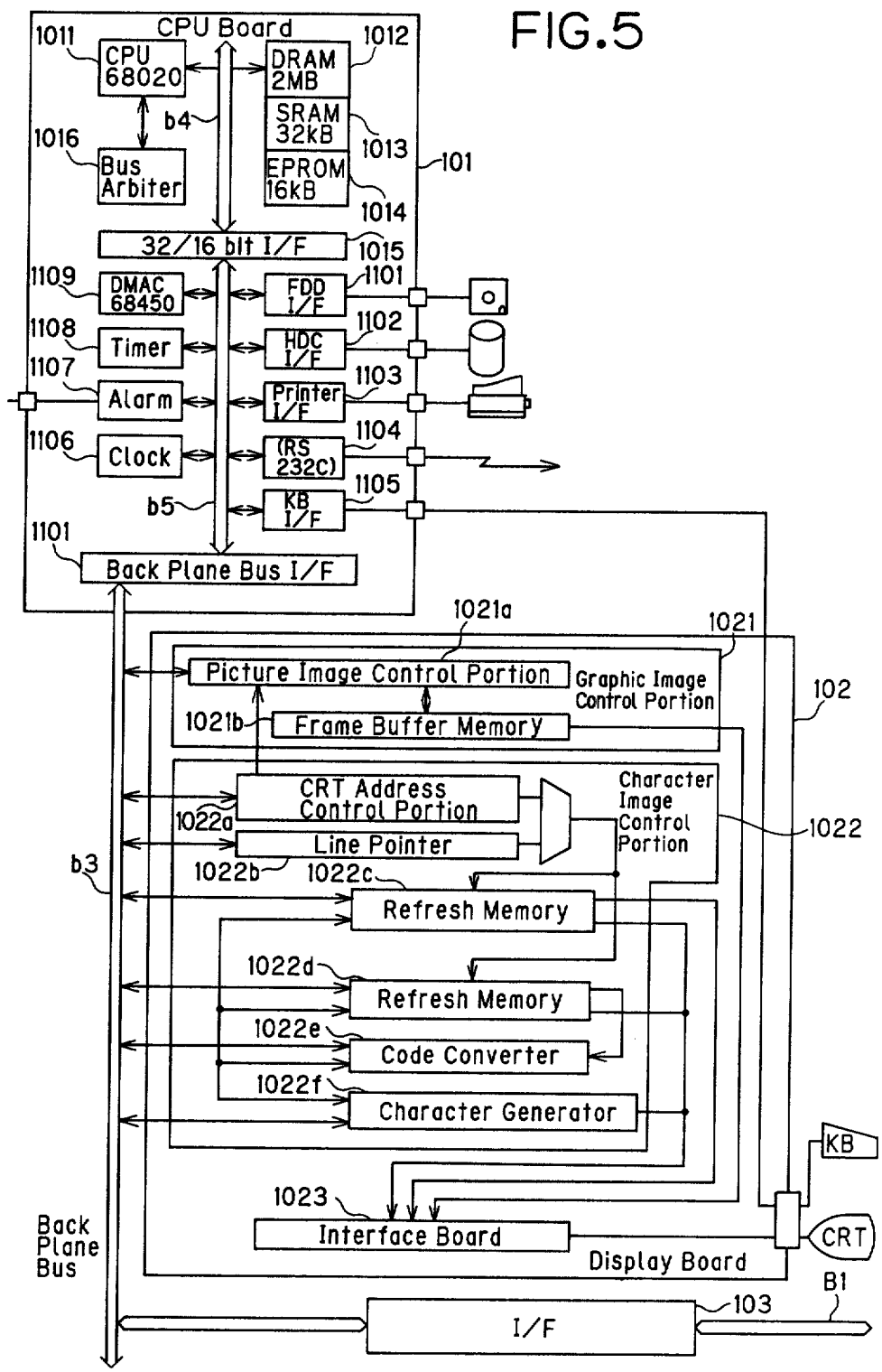
FIG. 5 is a view depicting the internal structure of the line computer used in the invention system.

The functions of computer 10 and line controller 40 will be described herein below in greater detail relative to each block. Turning to FIG. 5, which depicts the internal construction of computer 10, computer 10 has an outer appearance which is the same as an ordinary personal computer, and comprises a CPU board 101, a display board 102, input-output CRT portion, a keyboard KB, and an interface board 103 connectable to a bus B1. Connected to each other through a back plane bus b3, are CPU board 101 for operation control 1, display 102 for display control of the CRT, and interface board 103 connected to line controller 40.

Display board 102 is a block having character and graphic displaying functions, and comprises a graphic image control portion 1021 for controlling graph and figure displays and a character image control portion 1022 for mainly displaying a character.

Graphic image control portion 1021 controls display of figure and graph in accordance with read-out and programming operations of the CRT address control and a picture image control portion 1021a relative to a frame buffer memory 1021b.

Character image control portion 1022 calls a refresh memory (from a function portion) 1022c and another refresh memory (from a code portion) 1022d in accordance with a command from a line pointer memory 1022b. A code output from refresh memory 1022d is subjected to code conversion at a code converter 1022e, so that a character is outputted from a character generator 1022f. Thus, outputted character pattern is subjected to parallel-serial conversion at a converting portion 1023 and is displayed at CRT. Such display is also performed with respect to subordinate information from the refresh memory 1022c such as inverse display and blinking, etc.

For example, upon key operation at keyboard KB, display instruction is made with CPU board 101. If a graphic display instruction is made, CRT address control and the picture image control portion 1021a read-out and program display data such as figure and graph relative to frame buffer 1021b, and graphic display is performed at the CRT through parallel-serial converter 1023. If a character display instruction is made, upon instruction from CPU board 101, displaying position is defined by CRT address control portion 1022a and line pointer memory 1022b, and character generator 1022f calls a character pattern, and corresponding subordinate information are displayed at the CRT through parallel-serial converter 1023.

CPU board 101 is connected to a back plane bus interface 1111. CPU board 101 is primarily constituted by a 32 bit microprocessor 1011 (CPU68020, 16.67 MHz), and a DRAM 1012 of 2MB, SRAM 1013 of 32 KB, and EPROM 1014 (erasable programmable read only memory) of 16KB, all being connected to an internal bus b4 of a 32 bit system.

Furthermore, back plane bus interface 1111 is connected to an internal bus b5 of 16 bits to which are connected floppy disc interface 1101 in an ordinary computer, hard disc interface 1102, a printer interface (e.g. a Centronics Printer) 1103, an interface 1104 (e.g. RS232C) transmittable to a host side computer, Keyboard KB interface 1105, a clock generator 1106 for generating an operation timing, an alarm input-output portion 1107 for sending and receiving signals indicative of abnormal condition, a timer interruption controller 1108, and a direct memory access control portion 1109 (DMAC68450, 8.33 MHz). The 16 bit internal bus b5 is connected to a 32 bit internal bus b4 by way of 32 bit-16 bit converter 1015 adapted to control the operation timing.

Further, CPU 1011 is provided with a bus arbiter 1016 which determines bus occupation priority with respect to a block (e.g. DMAC 1109) which is capable of being a bus master in the system.

In the CPU board 101, CPU 1011 is accessible to memory blocks 1012, 1013, and 1014 for conducting processing programs, and performs control of floppy disc 1101 and hard disc 1102, printer control 1103, and communications to the host computer not shown through interface 1104.

Access to memory blocks 1012, 1013, 1014 by the CPU 1011 of the CPU board 101 is achieved as follows.

Inexpensive DRAM (2 MB) is used as memory block 1012, and a program segment and a data segment are indexed to the memory block, and are used in a page mode. An SRAM (32 KB) is used in the memory block 1013, and an EPROM (16 Kb) is used in memory block 1014.

The DRAM page mode referred to herein is an operational mode for starting next page access upon termination of access to any page, in storing information to which a microprocessor is accessible at DRAM by every page, being at the same row address unit.

Figure 6:
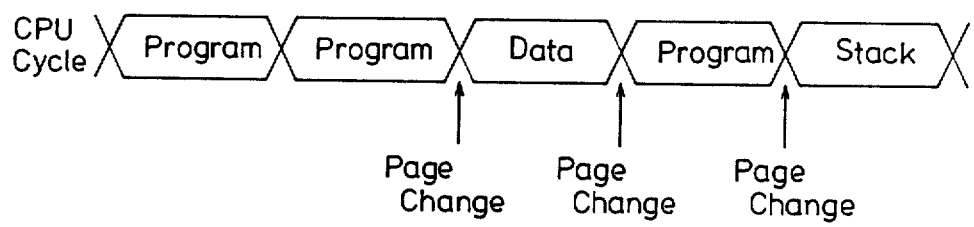
FIG. 6 is a schematic view depicting a conventional DRAM access system.

According to a conventional page access method, programs and data information coexist together and are subjected to page control in the DRAM 1012, for example. As shown in FIG. 6, if a data region is intended to be referred to during access of a program region by the microcomputer, a page of the program region in operation is closed, and the desired pages at the data region are opened by page change control for access of the desired data region. Then, if the original program region is intended to be recovered, the data region page in operation is closed, and the desired program region page access is made by opening the desirable page under page change control. Then, if a working region access is intended, the program region in operation is closed to open a working region page by page change control, for access. This is how the conventional page change access is accomplished. According to this conventional access method, page change control is required at every change to access regions. If the change in memory access region is frequently performed, it takes a long time for access, to thus degrade overall processing.

Figure 7:
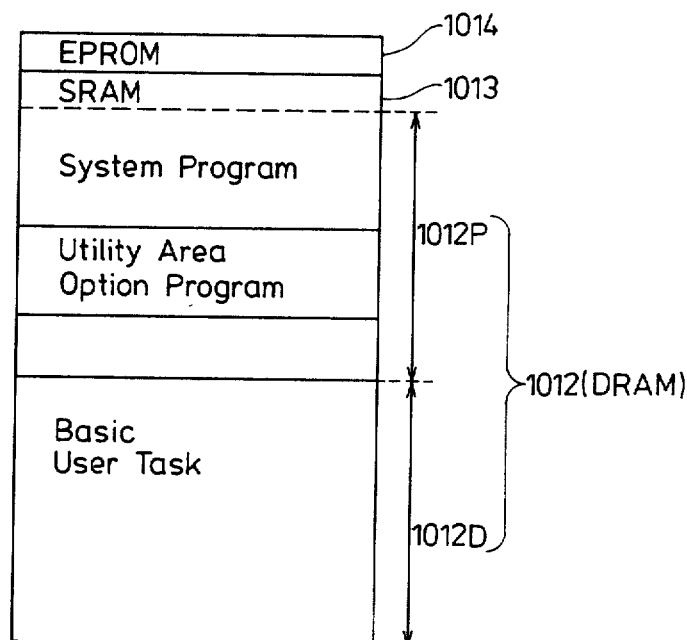
FIG. 7 is a view depicting a memory map of a CPU board in the line computer used in the invention system.

In the invention, however, a shown in FIG. 7, 2MB of the DRAM 1012 is divided into a program segment 1012P(1 MB)and a data segment 1012D (1 MB) and SRAM 1013 is physically applied to a stack segment for increasing memory access speed.

The basic interpret function and machine language are predetermined in program segment 1011P, in which there are provided primarily a system program region where a basic user task program defined in the data segment 1012D is interpreted by the CPU 1011, a utility region where formatting is conducted relative to the floppy disc, an option program region for printer control, and an enlarging region.

Data segment 1012D provides a region for storing a plurality of basic user task program determined in line computer 10. The basic user task program is defined, by an intermediary language consisting of a so-called machine language routine, and which is successively read out by CPU 1011, and is subjected to access as if it were data.

The stack segment 1013 (32 KB) is a working region of CPU 1011. Also, the start edge program of line computer 10 is defined in EPROM 1014 (16 KB).

Line computer 10 is of an interpreter type. When, CPU 1011 carries out basic program applied from the outside, CPU conducts processing with the intermediary language in data segment 1012D by making use of the basic interpreter function in program segment 1012D.

Figure 8:
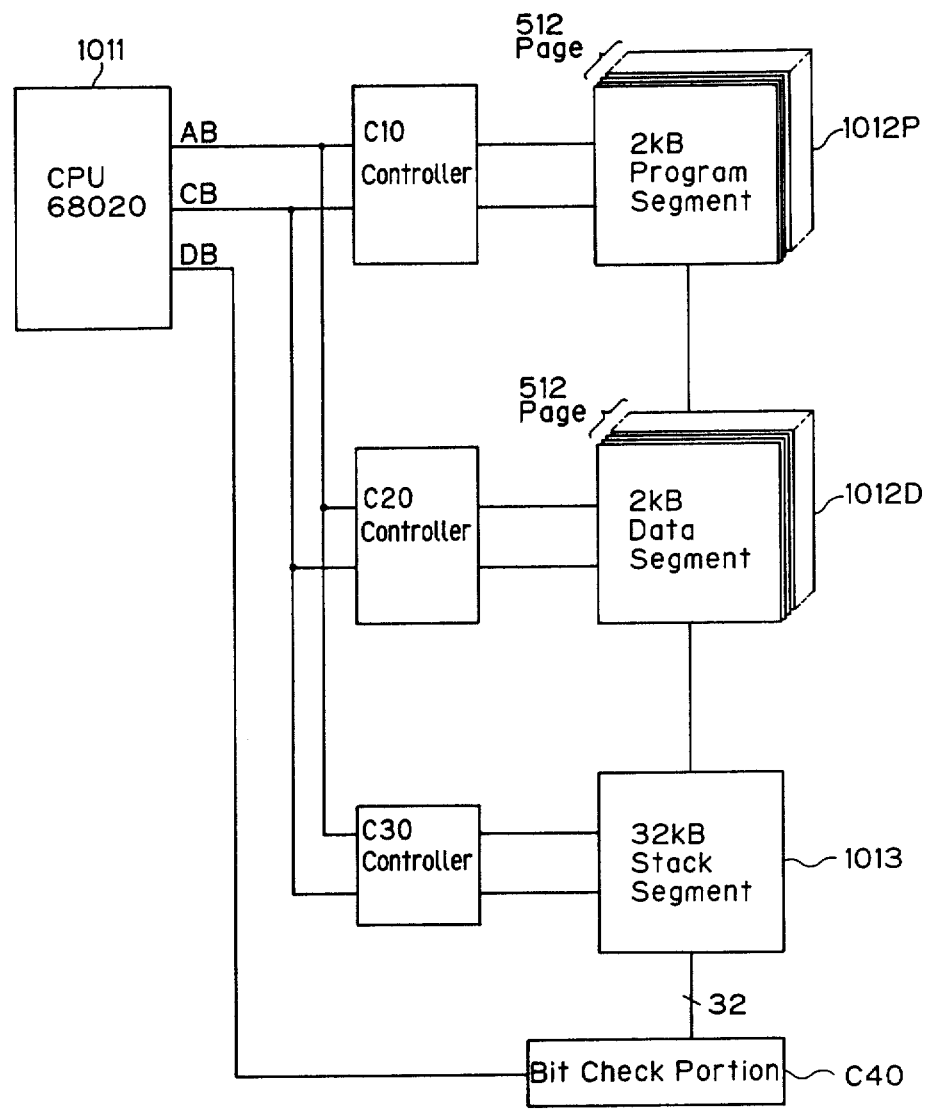
FIG. 8 is a view depicting a memory access system of a CPU board in the line computer used in the invention system.

FIG. 8 depicts a memory access system in relation to the above described memory map, comprising controllers C10 and C20, which are independent of each other and are provided relative to program segment 1012P and data segment 1012D in CPU 1011. The page now opened is stored by controllers C10 and C20. Thereafter, if access is required, high speed access is conducted with column address only, provided that the accessing row address is the same as that at the opened page. On the other hand, access is conducted after page change provided that the access page is different from the opened page. Therefore, high speed access is achieved when access continues within the identical page, and slightly prolonged access is conducted when of different page. However, high speed access is, on the average, generally achieved.

In FIG. 8, 1MB of DRAM 1012 is applied to the program segment 1012P, and 2K bite, 512 pages is inclusive in a single page. 1MB of DRAM 1012 is applied to data segment 1012D, and 2K bite, 512 pages are inclusive in a single page. Controller C10, controller C20 and controller C30 are disposed on program segment 1012P, data segment 1012D, and stack segment 1013, respectively.

In the block diagram shown in FIG. 5, controllers C10, C20 and C30 (although not shown) are disposed at positions corresponding to the memory blocks 1012 and 1013.

Controllers C10 and C20 are connected to the CPU 1011 through an address bus AB and a control bus CB, and data outputted from the respective memory blocks are supplied to the CPU 1011 through data bus DB after the data is subjected to bit check at a bit check portion C40.

Figure 9:
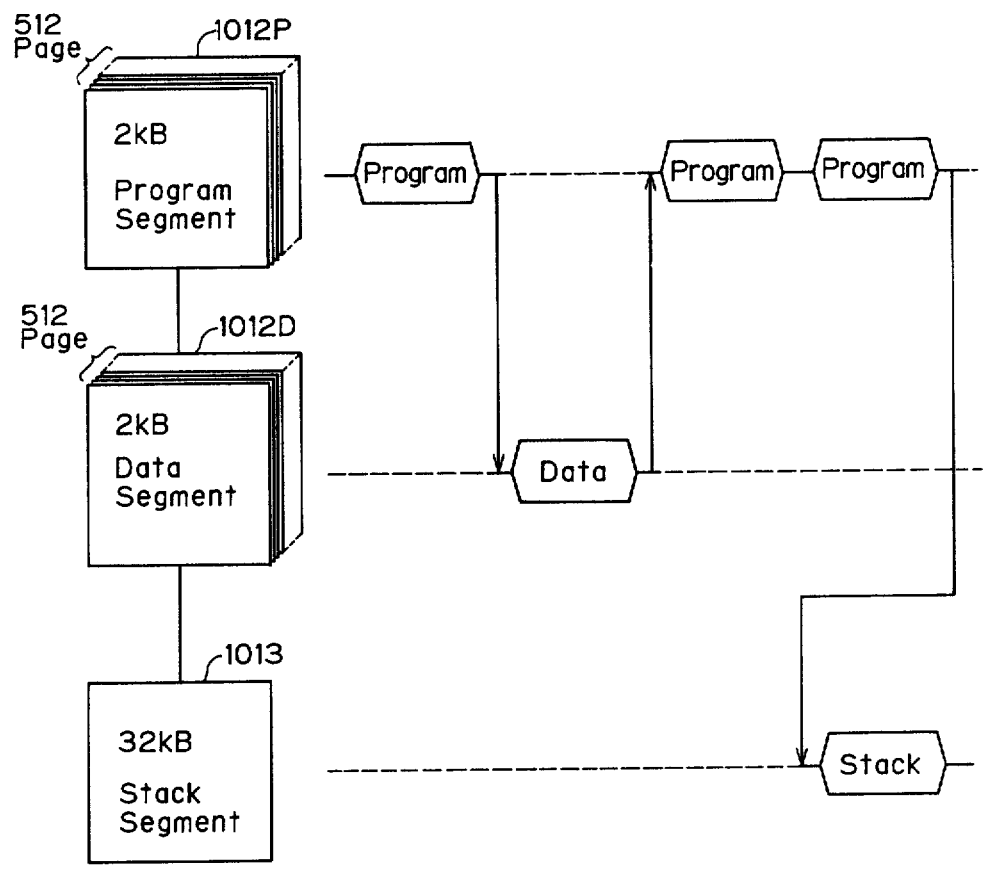
FIG. 9 is a schematic view depicting a memory access system of the invention.

According to the access method of the invention, as shown in FIG. 9, page access is independently conducted by positioning controllers C10, C20 and C30 on program segment 1012P, data segment 1012D, and stack segment 1013, respectively, so that it is unnecessary to perform page change operation in the case of shifting of the access region, such as from program segment 1012P to data segment 1012D, from the data segment 1012D to the program segment 1012P, and from the program segment 1012P to the stack segment 1013, etc. Thus, high speed access is achieved.

Figure 10:
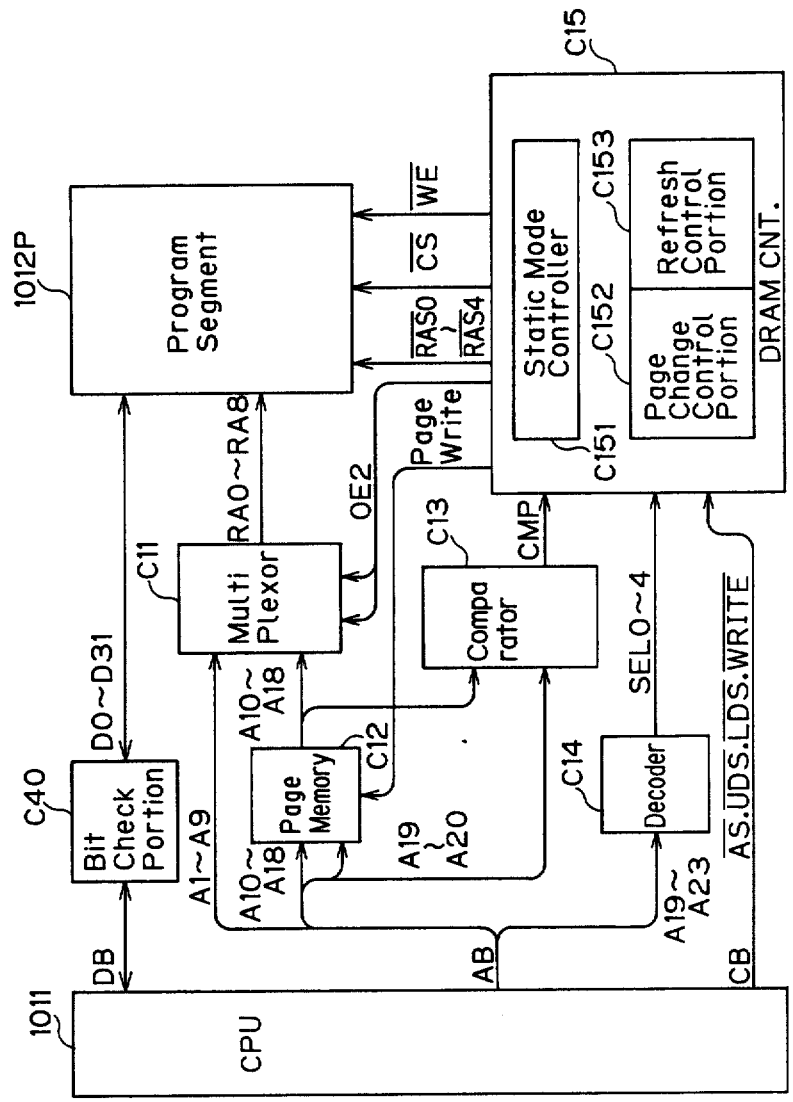
FIG. 10 is a structural view depicting a memory controller of the CPU board in the line computer used in the invention system.

In FIG. 10, which depicts details of controller C10 or C20 shown in FIG. 8, controller C10, and a programs segment 1012P (1MB) are depicted in the form of a static columh DRAM as an access region. Controller C10 is similar in details to controller C20. CPU 1011 supplies address A1 to A23 to address bus AB and control signals $\overline{AS}$, $\overline{UDS}$, $\overline{LDS}$, $\overline{WRITE}$ to control bus CB during access.

Among these, addresses A1-A9 correspond to column addresses to be supplied to a multiplexer C11. Addresses A10-A18 correspond to row addresses to be supplied to page memory C12 and a comparator C13. Addresses A19-A20 are selection signals of page memory C12. Page information which is previously subjected to access by a page write signal PAGE WRITE is held in page memory C12. Addresses A19-A23 are given to a decoder C14 and memory selection signals SEL0-SEL4 are supplied to DRAM controller C15.

In comparator C13, page information previously subjected to access as given by the page memory C12 is compared with row addresses A10-A18 which are intended to perform access.

Upon outputting coincident output CMP from comparator C13, static mode controller C151 in DRAM controller C15, is operated.

The static mode control portion C151 renders multiplexer C11 to be enabled, and multiplexer C11 supplies column address signals RA0-RA8 (A1-A9) to program segment 1012P. For this, CPU 1011 performs access to the program segment only by the column address RA0–RA8, so that data D0–D31 are trapped through bit check portion C40 upon receipt of chip select signal CS of DRAM controller C15. In this state, row address strobe signals RAS0–RAS4 are maintained assertive.

Provided that the previously held page information in page memory C12 is different from the present row address, non-conformance signal is supplied from comparator C13, so that page change control portion C152 of DRAM controller C15 is operated.

Page change controller C152 negates row address strobe signals RAS0–RAS4, and supplies signals PAGE WRITE indicative of writing new page information (row address A10–A18) to page memory C12. Thus, page memory C12 holds the new page information. This page information (A10–A18) are also supplied to multiplexer C11, which supplies new page information RA0–RA8 to the program segment 1012P by the enable signal of DRAM controller C15, so that program segment 1012P is subjected to page change. Next, the static mode control portion C151 is actuated in DRAM controller C15, so that the column address strobe signal (CS equivalent) is generated, and column address RA0–RA8 (A1–A9) are supplied to program segment 1012P to thus allow the CPU 1011 to perform access.

Memory refreshing is required at refresh control portion C153 in DRAM controller C15 and page change control portion, C152 initiates the refreshing operation. After refreshing operation, DRAM controller C15 negates signals RA0–RA4, and requires outputting of the page information which is before the refreshing operation and stored in page memory 12, so that signals RAS0–RAS4 are asserted and access is continued on the basis of the page information prior to the refreshing operation.

Page memory C12 holds the identical page even after the refreshing operation, and access is performed by this page information. Thus, the access operation can be made regardless of the refreshing operation.

Figure 11:
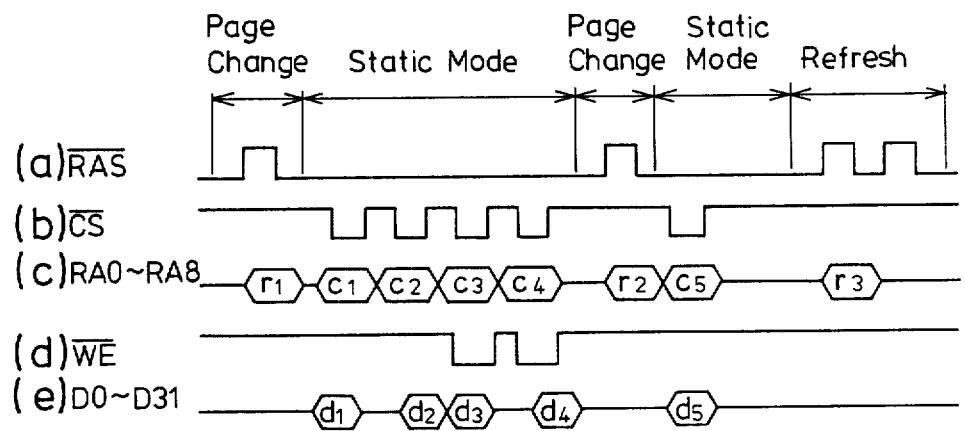
FIG. 11 is a time chart showing operation of a memory access controller used in the invention.

FIG. 11, shows a time chart of one example of the operation of the controller C10, wherein for the initialization of the system, row address A10–A18 from CPU 1011 is supplied and stored in page memory C12, and page change control is performed where row address strobe signal RAS0–RAS4 are supplied for access to the desired page.

When the row address RA0–RA8 (A10–A18) in page memory C12 is indicated as row address (r1) in program segment 1012P by multiplexer C11, DRAM controller C15 provides static mode for actuating static mode control portion C1. Thereafter, column address RA0–RA8 (A1–A9) is supplied as column address C1 to program segment 1012P through multiplexer C11, and CPU 1011 performs access to data d1 in program segment 1012P in accordance with chip select signal CS active from DRAM controller C15.

If the row address A10–A18 to be given in the subsequent cycle is identical with the previous row address, static mode controller C151 is actuated in response to the coincident signal CMP from comparator C13, and access to data d2 is performed only by column address c2 (RA0–RA8).

Similarly, CPU 1011 performs access to data d3 and d4 only by the column address.

In case of access to data d3 and d4, write enable signal WE becomes "L", in data writing in cycle in this figure.

In a subsequent cycle, the page information (row address) subjected to access in the previous cycle and stored in the page memory C12 is different from the presently supplied row address. Page change control is performed at "H" level of the row address strobe signal RAS, and the row address A10–A18 is supplied to the program segment 1012P as the address signal RA0–RA8 (row address r2) through the multiplexer C11. In the next timing, column address A1–A9 is supplied to program segment 1012P as address signal RA0–RA8 (column address c5) from multiplexer c11, so that access to data d5 is performed.

In the next cycle, refreshing request is made at refreshing control portion C153 and refreshing operation is initiated by page change controller C152. The refreshing address in this instance is the row address r3 generated by, for example, a refreshing address counter (not shown).

After the refreshing operation, page information stored in the page memory C12 is read out for storing access.

As described above, advantageously, high speed access is achieved, since access is obtained by the use of the column address provided that the identical row address is given in maintaining the page information, and since the access can be re-started in accordance with the page information in page memory C12 after the refreshing operation.

Figure 12:
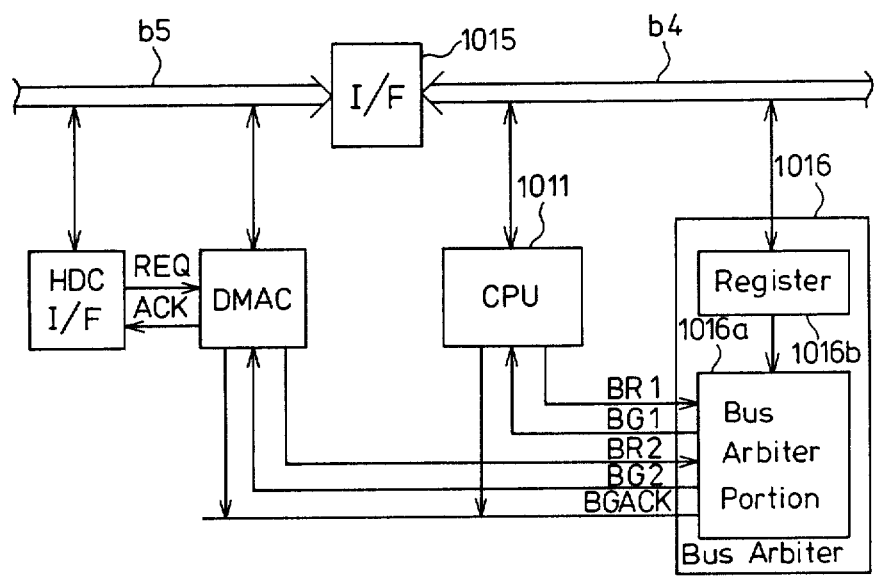
FIG. 12 is a view depicting a bus arbiter of the CPU board in the line computer used in the invention system.

In FIG. 12, which describes the primary function of bus arbiter 1016 in CPU board 101 shown in FIG. 5, bus arbiter 1016 comprises a bus arbiter portion 1016a adapted to input and output bus request signal BR and bus grant signal BG sent from CPU 1011 functioning as a bus master or a direct memory access controlling device DMAC, etc. The bus arbiter 1016 also comprises register 1016b, which is subjected to free reading and writing by the bus master. Bus occupation priority is determined by the content described in the register. Thus, bus occupation priority, which is conventionally fixedly held, can be changed, to thereby efficiently use the bus.

Figure 13A:
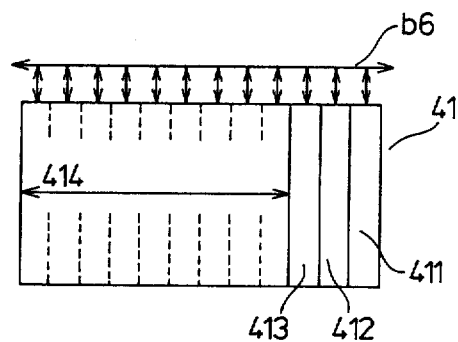
FIGS. 13(a), 13(b) and 13(c) are schematic elevational views depicting controller used in the invention system.
Figure 13B:
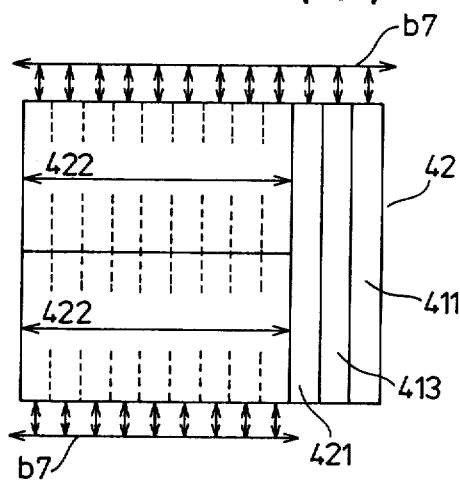
Figure 13C:
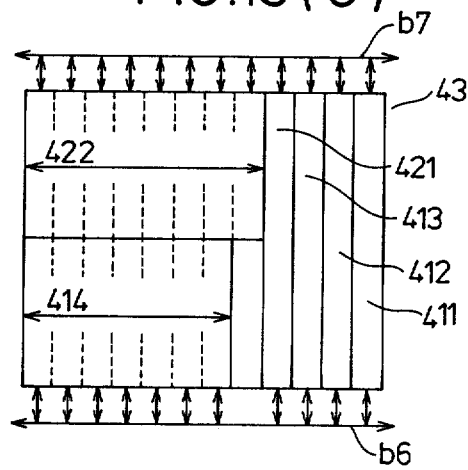

FIGS. 13(a), 13(b) and 13(c), schematically illustrate typical modes 41, 42 and 43 of line controller 40 shown in FIG. 4, wherein line controller 40 is classified as a line controller 41 shown in FIG. 13(a), line controller 42 shown in FIG. 13(b) and line controller 43 shown in FIG. 13(c), in conformance with the type of equipment disposed on manufacturing line 20.

Line controller 41 shown in FIG. 13(a) is of an ordinary type and comprises in its internal bus b6, an electrical power source card 411, a processor card 412 on which software is provided for controlling line controller 41, a transmission interface 413 for communication with a host line computer 10 or other line controller, and an input-output portion 414.

Power source card 411, processor card 412, and transmission interface 413 do not have any specific card hardware function. Hardware segments are mounted on a printed board to form the card construction.

The input and output portion 414 is also in the form of a card. Line controller 41 can be assembled therein as maximally eight pieces of input-output cards for inputting and outputting analog and digital signals from the manufacturing line.

Line controller 42 shown in FIG. 13(b) is of the sequential control controller type, and comprises a transmission interface 413 which communicates with the host line computer 10 or other line controllers, and a sequence control portion 421 instead of processor card 412 for carrying out sequence table described later in response to the input signal from sequence input-output portion 422. Each of the blocks is in the form of a card connected to the internal bus b7. Maximally, only 16 pieces of the sequence input-output portion are needed for installation.

Line controller 43 is of the hybrid type constituted by ordinary line controller 41 shown in FIG. 13(a) and sequence control type line controller 42 shown in FIG. 13(b), and comprises a processor card 412 and a sequence control portion 421. Maximally, only 8 pieces of sequence input-output cards and maximally only 7 pieces of the ordinary input-output cards are needed for installation.

Incidently, with respect to the ordinary type line controller 41 shown in FIG. 13(a) and the hybrid type line controller 43 shown in FIG. 13(c), it is not necessary to provide processor card 412. In this case, the controller is directly controlled by line computer 10.

Figure 14:
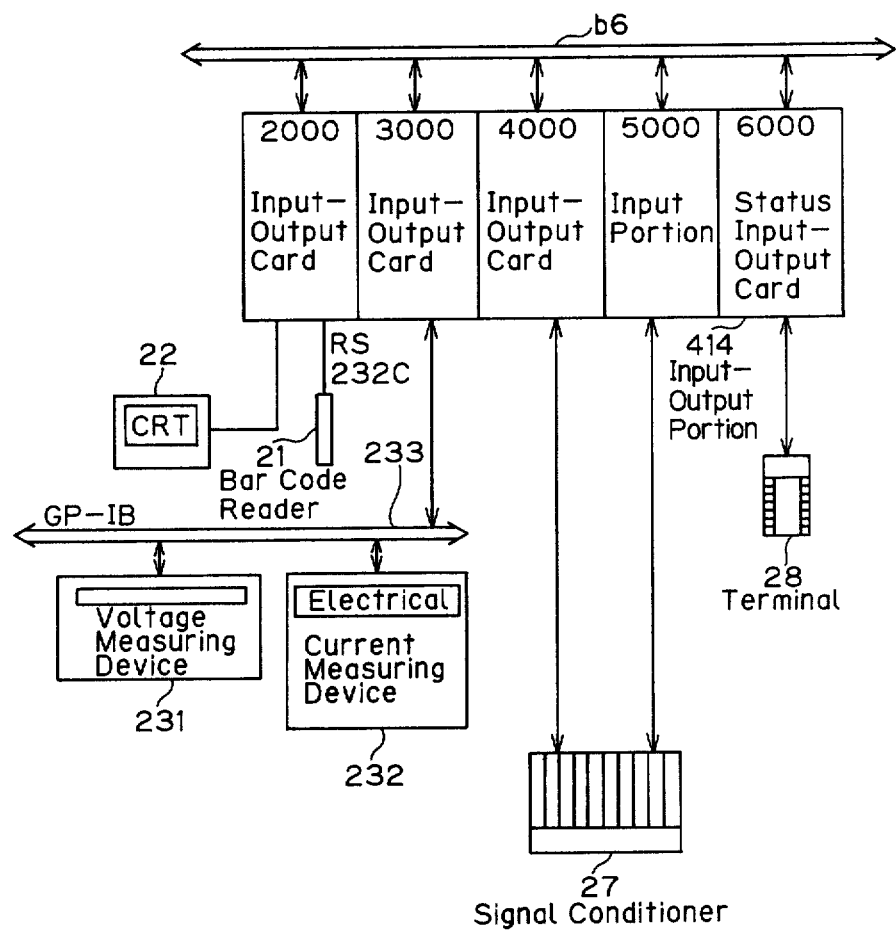
FIG. 14 is a view depicting the function of the input-output portion of the line controller used in the invention system.

FIG. 14 is a system diagram showing the relationship between a typical card device at the input-output portion 414 of the ordinary line controller 41, and various equipment connected thereto. An input-output card 2000 is responsive to the signal from the local man-machine interface, and uses a bar code reader 21 and CRT 22 as the local man-machine interface. Input-output card 2000 inputs output signals from bar code reader 21 through RS 232C, and data read out by card 2000 is converted into a video signal which is outputted to CRT 22.

Figure 15:
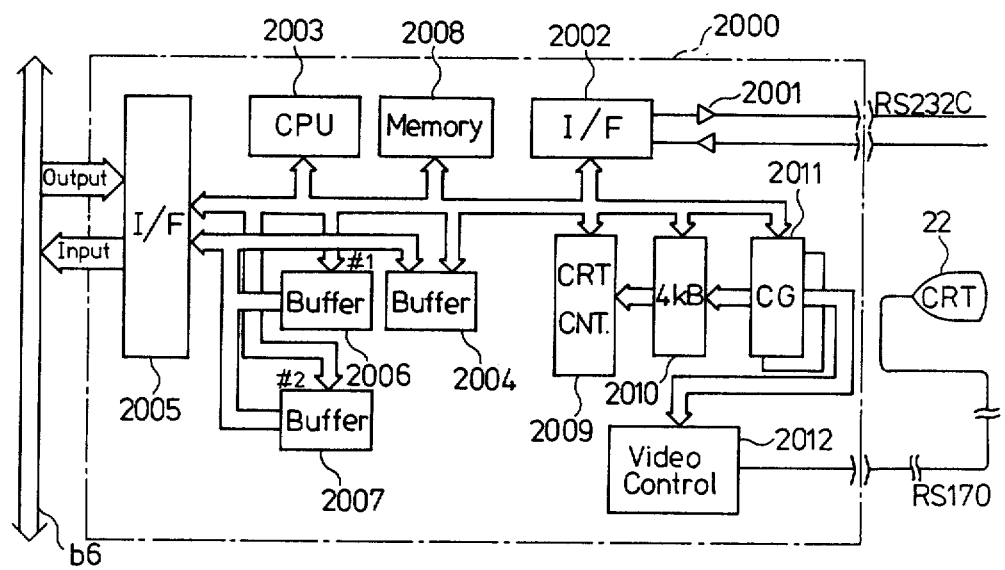
FIGS. 15-19 are views depicting the internal structures of typical input-output cards of an ordinary line controller used in the invention.

Details of input-output card 2000 are shown in FIG. 15, wherein data from bar code reader 21 is received in a driver receiver 2001 through a transmission line, such as RS232C, and the data is received by synchronous interface 2002. The data in CPU 2003 is supplied through an output buffer 2004 from a bus interface 2005 and an internal bus b6 to a processor card 412 of the controller 41 or interface 413. Transmission data from a host line computer 10 is supplied from the transmission interface 413 of controller 41 to the bus interface 2005 of input-output card 2000. In this case, an input buffer 2006 and, an input buffer 2007 are used as changeable buffers. Upon one of them being filled with data, data storing is initiated with respect to the remaining buffer.

Also a memory 2008 is provided in which are stored information necessary for operating CPU 2003.

When data is transmitted through RS232C, CRT controller 2009 reads out a code from refreshing memory 2010 (4KB) which code corresponds to the data, so that the pattern is outputted from a character generator 2011, and data is displayed on CRT 22 through the transmission line RS170 under control of a video control portion 2012.

Returning to FIG. 14, input-output card 3000 is adapted to receive, through a GP-IB line 233, digital signal sent from electrical equipment, for example, an electric voltage measuring device 231 and an electrical current measuring device 232.

Figure 16:
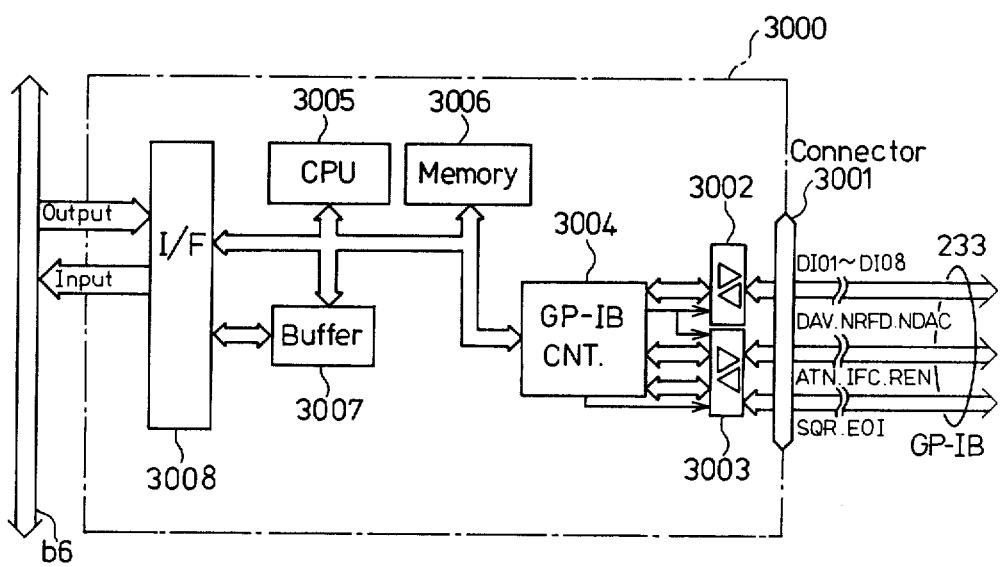

FIG. 16 depicts details of input-output card 3000, comprising a connector 3001 adapted to connect GP-IB transmission line (data bus DI 01–08, transfer control bus DAV, NRFD, NDAC, control bus ATN, IFC, REN, SQR, EOI); a driver receiver 3002 with respect to data bus DI 01–DI 08; a driver receiver 3003 with respect to the transfer control bus DAV, NRFD, NPAC and a control bus ATN, IFC, REN, SQR, EOI, and a GP-IB control portion 3004. Input-output card 3000 comprises a transmission interface 3008 adapted to communicate with a central processing unit CPU 3005 which controls overall operation, a memory 3006 added to CPU 3005, a buffer 3007 for the transmission, and processor portion 412 or the transmission interface 412 in the ordinary line controller 41.

In the input-output card 3000, digital signal from the electrical equipment, such as the electric voltage measuring device 231 and the electric current measuring device 232 is received from GP-IB transmission line 233 through connector 3001, driver receivers 3002,3003 and GP-IB control portion 3004, the signal is provisionally stored in buffer 3007, and is transmitted by CPU 3005 to processor portion 412 or transmission interface 413 in ordinary line controller 41 through bus interface 3008 and internal bus b6. Further, data from line computer 10 or ordinary line controller 41 is stored in buffer 3007 through bus interface 3008, and data is transmitted from GP-IB control portion 3004 to the equipment through GP-IB transmission line 233.

Returning again to FIG. 14, signals from signal conditioner 27 are received at input-output cards 4000 and pulse input portion 5000. Signal conditioner 27 comprises an industrial signal converter in which analog detection signal, from a thermocouple and resistance thermometer disposed on the manufacturing line, is converted into 1 through 5 v signals, and pulse input from a pulse integrating indicator is converted into pulse row, and the converted signal or pulse is outputted so as to provide an output of 4 through 20 mA at the operation end for temperature control.

Figure 17:
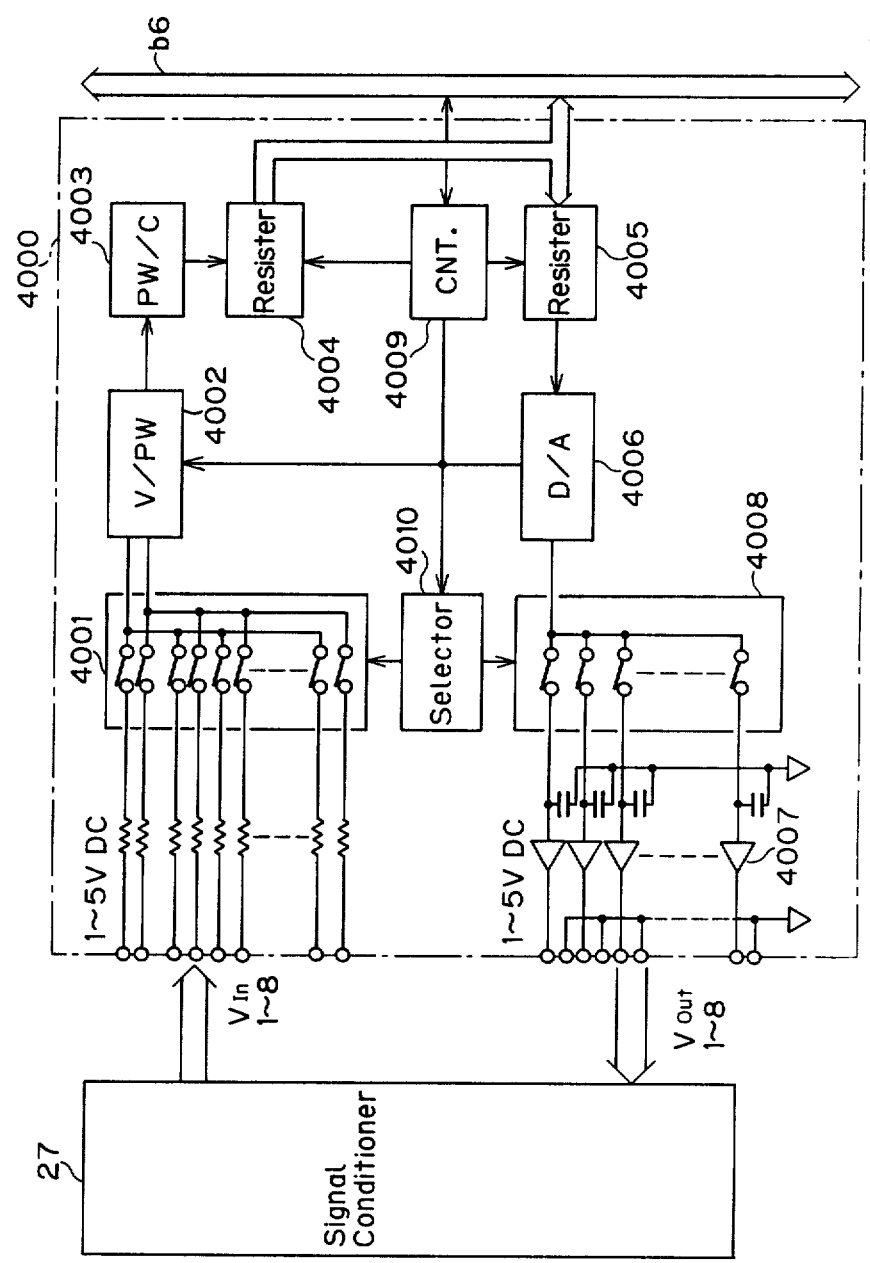

Input-output card 4000, as depicted in detail in FIG. 17, has an input side provided with an input multiplexer 4001 adapted to receive analog signals VIN 1–VIN 8 (1–5 v DC) and to select one point, V/PW converter 4002 adapted to convert the inputted analog signal into voltage/pulse width, PW/code converter 4003 adapted to convert pulse width into code signal, and an input register 4004 connected to internal bus b6, and has an output side provided with an output register 4005 adapted to hold data from internal bus b6, a digital to analog converter 4006 adapted to digital to analog convert a level within output register 4005, and an output multiplexer 4008 adapted to supply converted analog signal to one of the eight point output terminals VOUT 1–VOUT 8, through a hold amplifier 4007. A control portion 4009 controls feed timing at which the value in the input register 4004 is supplied to the internal bus b6, and the value in the output register 4005 is supplied to D/A converter 4006, and also controls a channel selector 4010 for selecting one point in the input multiplexer 4001 or the output multiplexer 4008

The analog signal input-output card 4000 receives several analog signals (1–5 v DC) from the signal conditioner 27 connected to various sensors, and sends code signal corresponding to the analog value to processor card 412 or transmission interface 413 of the ordinary line controller 41. Card 4000 also sends control signals from internal bus b6 to signal conditioner 27. Signal conditioner 27 converts the control signal into 1–5 v DC, 4–20 mA levels and outputs the converted levels to the operational ends of the various sensors.

In this example, analog signals can be inputted and outputted in analog signal input-output card 4000. However, card 400 can only provide analog signal input or analog signal output functions in accordance with the system used.

On the other hand, pulse input from signal conditioner 27 is inputted into the pulse input portion 5000.

Figure 18:
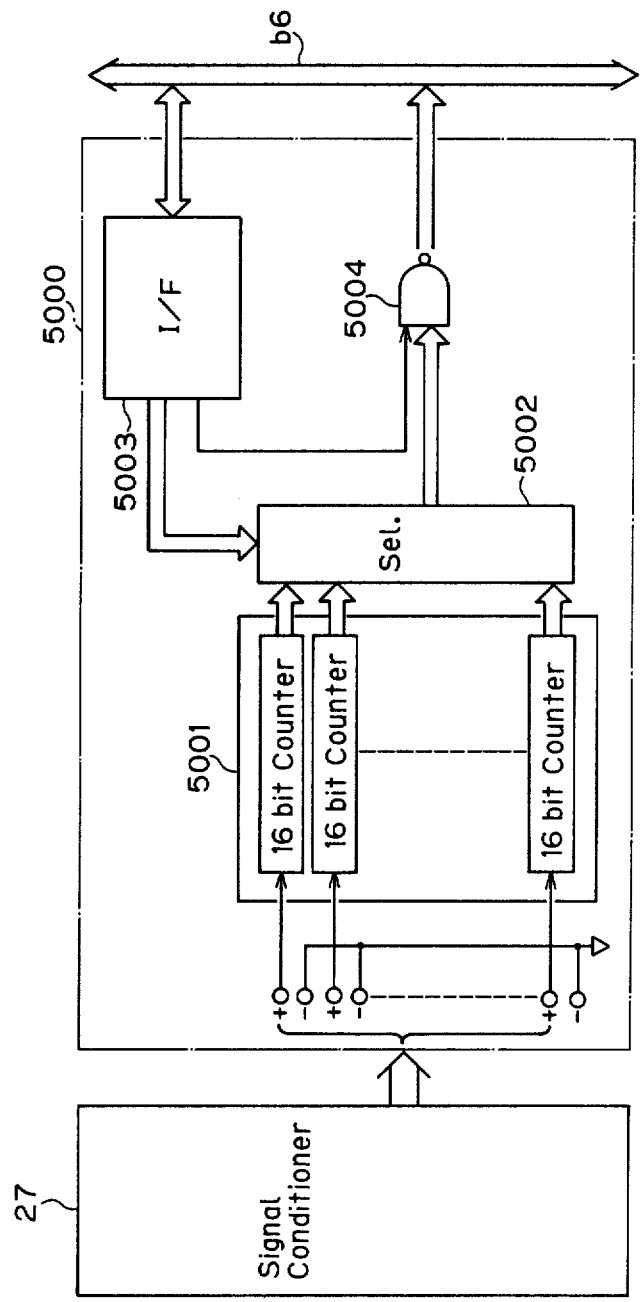

As depicted in FIG. 18, in the pulse input portion 5000, 16 dots pulse row from signal conditioner 27 is inputted, and 16 bits counter 5001 relative to each of the detection points conducts counting, and data of address indicated by data selector 5002 is selected. The thus selected data is transmitted, through internal bus b6, from a bus interface 5003 to one of the processor card 412 and the transmission interface 413 in the controller 41. A gate circuit 5004 transmits data from data selector 5002 to internal bus b6 with a timing at which bus interface 5003 outputs the data. Pulse input portion 5000 transmits a pulse input from a pulse integrating indicator connected to signal conditioner 27 to one of the processor card 412 and transmission interface 413 in controller 41.

Returning again to FIG. 14, a status input-output card 6000 is adapted to input and output a status relative to a terminal 28. The terminal 28 is an industrial signal relay unit for outputting ON-OFF signal as a status with respect to voltage status signals on terminal points installed on the manufacturing line.

Figure 19:
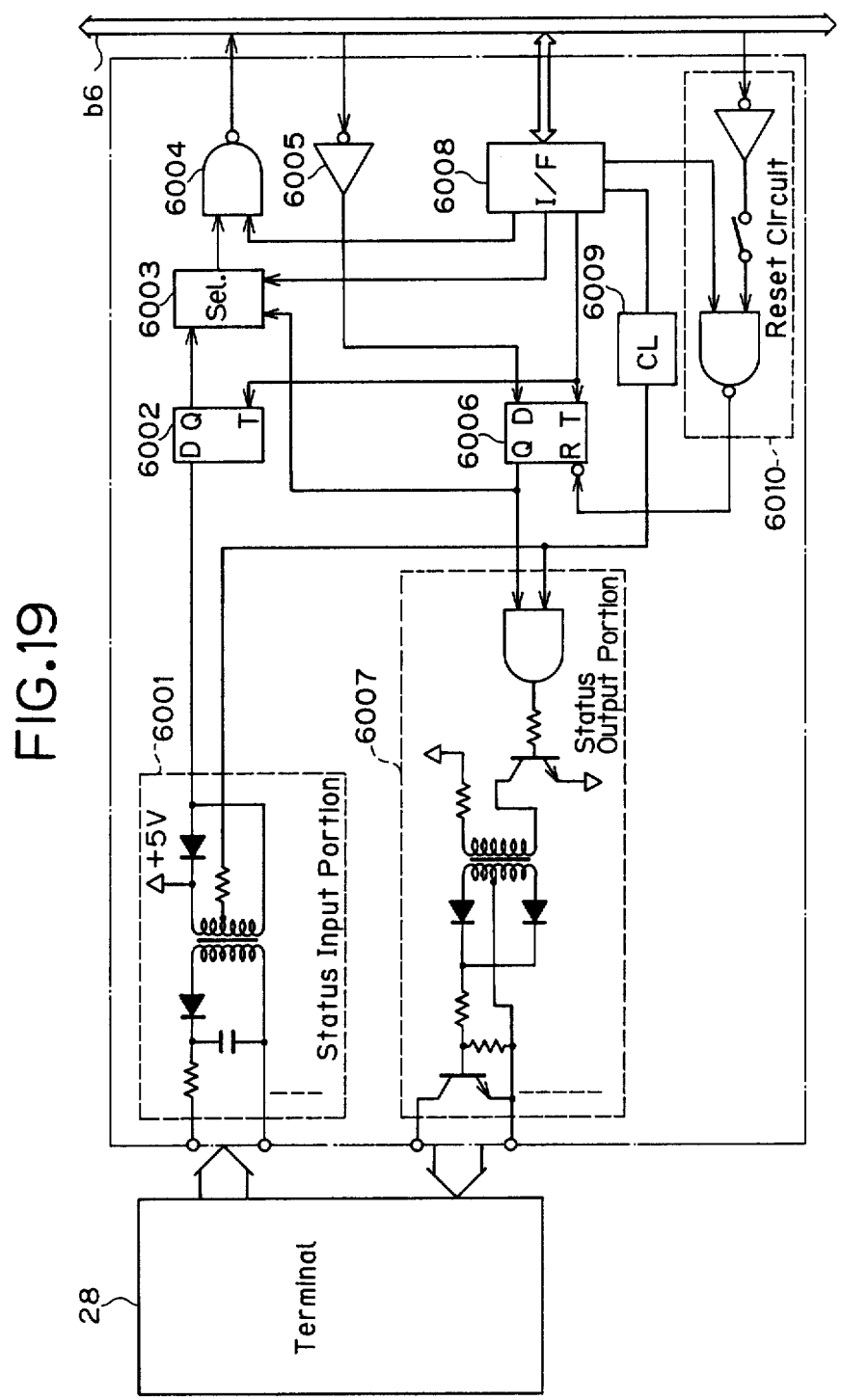

Details of the status input-output card 6000 are shown in FIG. 19, wherein status from terminal 28 is inputted into a status input portion 6001 having an input insulative transformer, and the status is supplied to input data register 6002. Status input portion 6001 and input data register 6002 can handle 16 dots input. Optimum dot status is selected among the inputted status by a data selector 6003, and the selected status is transmitted from an input gate 6004 to internal bus b6, and is hence transmitted to one of the processor card 412 and transmission interface 413 of line controller 41.

Data transmitted from one of the processor card 412 and interface 413 of controller 41,is supplied to an output data register 6006 through a buffer 6005. Output data register 6006 is provided with, for example, 16 points in accordance with the inputted number of points. The output point is determined by data selector 6003. A status output portion 6007 has a transistor output circuit and an output insulative transformer.

A bus interface 6008 controls input gate 6004, data selector 6003, input data register 6002 and output data register 6006. A clock generating portion 6009 controls the status input portion 6001, status output portion 6007 and bus interface 6008. A reset circuit 6010 resets the output data register 6006.

Input - output card 6000 receives the status , such as various terminal signals and voltage state signals in the manufacturing line, from terminal 28. The status is transmitted to one of the processor card 412 and interface 413 of controller 41. If the status control signal is supplied to card 6000 from processor card 412 or interface 413 of controller 41, this status control signal is supplied to the corresponding terminal 28 for transmitting therefrom controlling signal to the operating point.

The sequence control line controller 42, depicted in FIG. 13(c) will now be described with reference to FIGS. 20 and 21. As shown in FIG. 13(b), sequence control line controller 42 is provided with sequence control portion 421, and by internal bus b7, various status states are inputted from the various sequence elements installed on the manufacturing line through sequence input-output portion 422 for performing sequential processing.

A sequence control method is disclosed in Japan Patent No. 1139669, whose method is also available for use as a controller method in the invention.

The sequence control method used in the invention will now be described. FIG. 20 is a view showing the outline of the sequence control, and represents an operational concept of the sequence control line controller 42. A sequence table S1O has its processing preset by a status condition. The table is set at a sequence control portion 421 of the sequence control line controller 42. The status condition is shown by "Y" or "N" at the input-output portion 422, the "Y" and "N" being indicative of ON and OFF with respect to the sequence elements of the manufacturing line, such as various switch terminal input, switch setting, count& level setting, time level setting, etc. and being sent to sequence control portion 421.

Sequence control portion 421 has a microprocessor (not shown), which receives "Y" and "N" signals from the input-output portion 422 so as to perform the software program according to the sequence table S10. The results are supplied to the corresponding one of the sequence element such as a relay terminal in the form of ON-OFF signal from input-output portion 422.

Figures 20, 21:
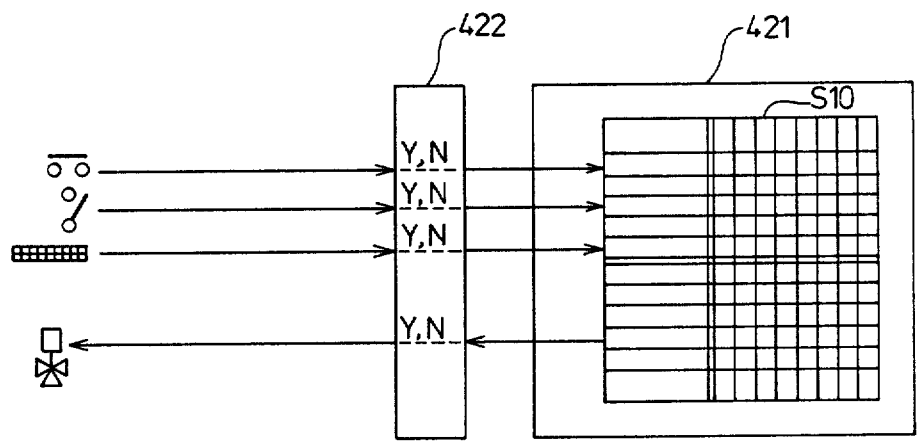
FIG. 20 is a view depicting the general concept of sequence control.
FIG. 21 is a view depicting an example of a sequence table.

FIG. 21 depicts a typical construction of a sequence table S10, wherein table number S11 is allotted, and the table generally consists of an operation start signal portion S12, a condition rule portion S13, an operation signal portion S14, and an operation rule portion S15. The condition rule portion S13 is allotted with a rule number S131 and a step number S132, whereas the operation rule portion S15 is allotted with a next step number S151.

In an example shown in FIG. 21, rule numbers S131 "01" and "02" will be specifically described. A valve B is opened "Y" when a start button is ON "Y" and a switch A is OFF "N", at the rule number "01". On the other hand, valve B is closed "N", when the switch A is ON "Y" at the rule number "02", and the operation is transferred to the next step number "02".

The same is true with respect to a subsequent operation. The operation rule S15 becomes "Y" and "N" according to the symbols "Y" and "N" of the condition rule S13, for sequence control.

The input-output portion receives signals from the sequence element of the manufacturing line as described above for supporting sequential control operation.

Figure 22:
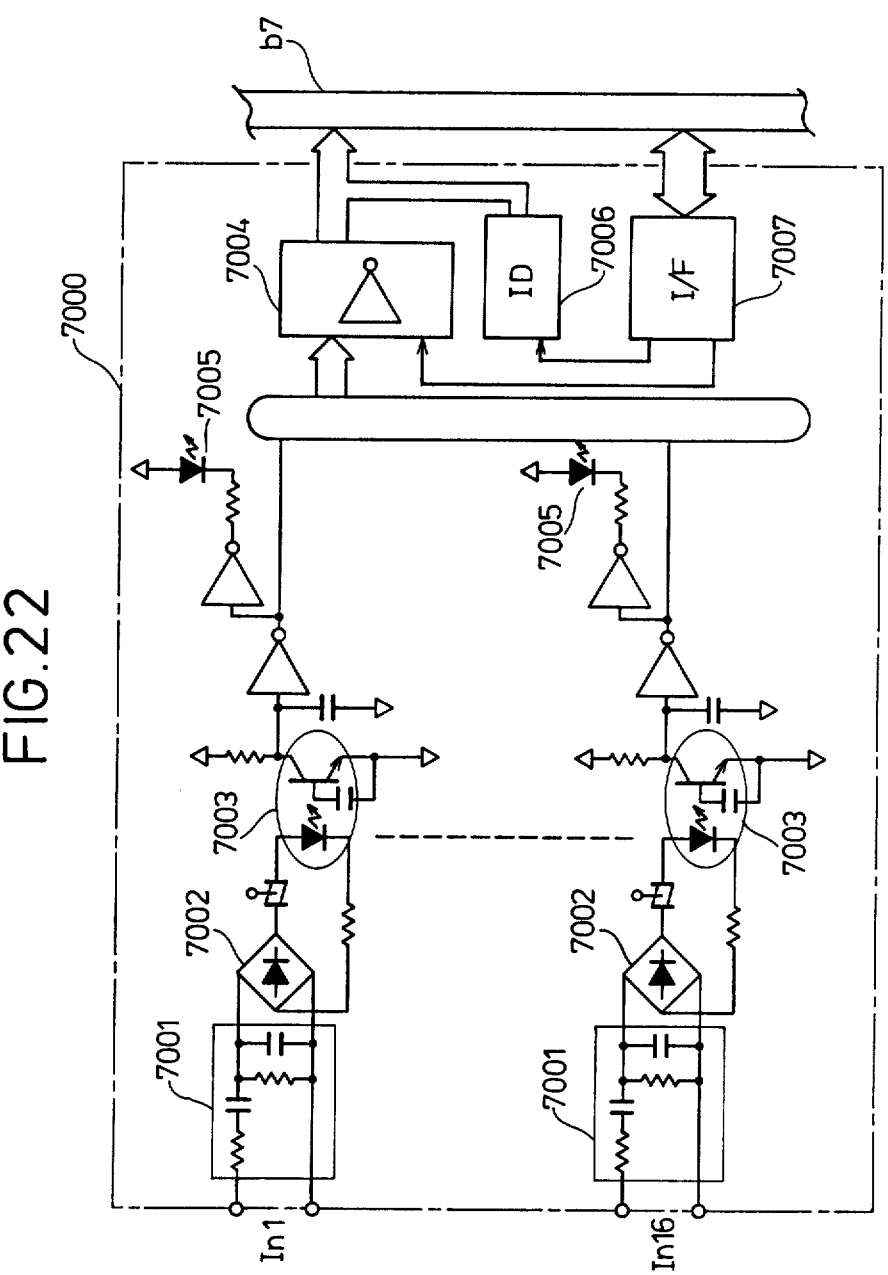
FIGS. 22 and 23 are views depicting the internal structures of typical input-output cards of a sequence control line controller. de
Figure 23:
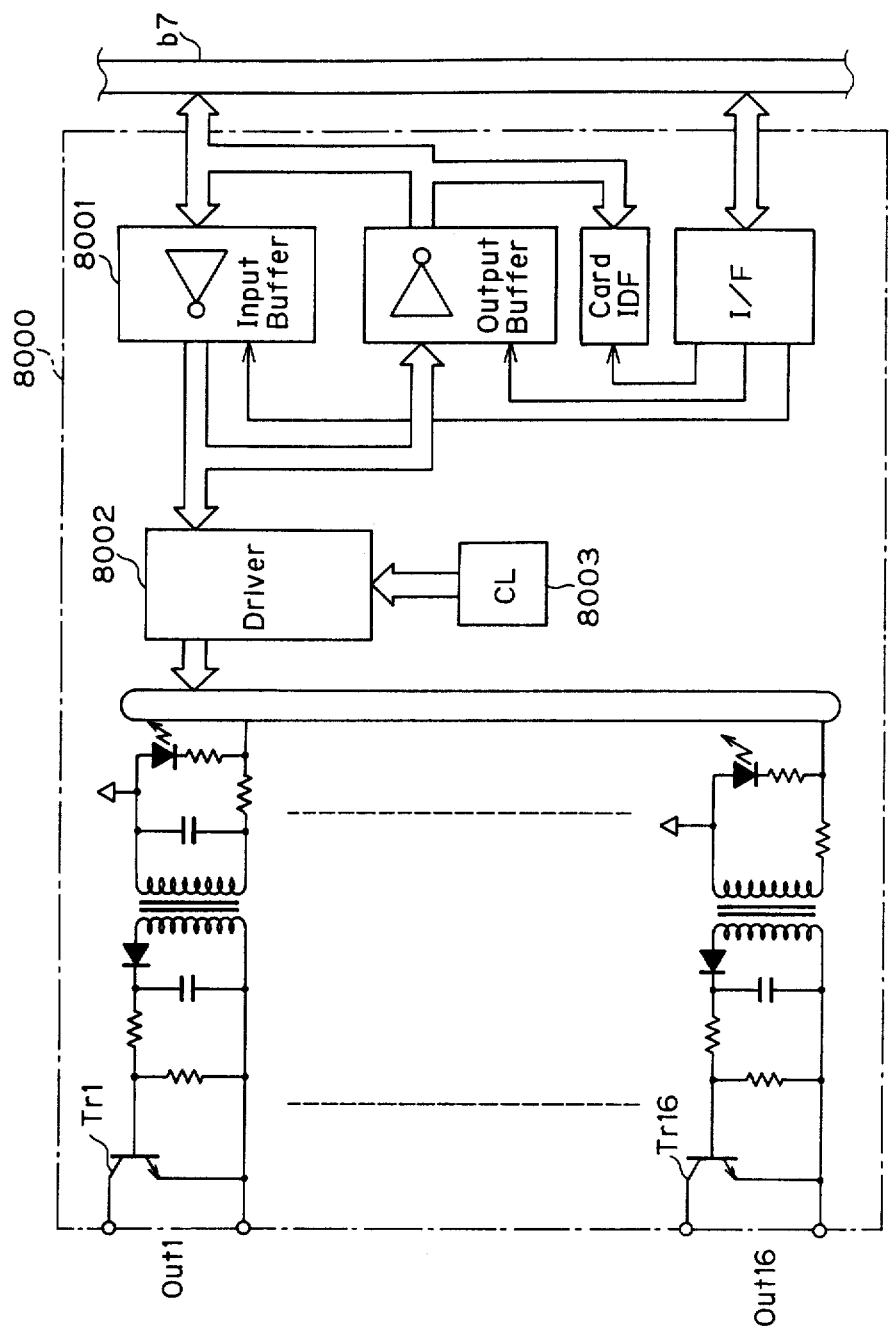

FIGS. 22 and 23 depict typical examples of the sequence input and output portion 422. Input card 7000, shown in FIG. 22, receives at 10 points, an external AC voltage signal which detects AC voltage signal which drives the relay terminal. On input card 7000, AC input is intaken through a smoothing circuit 70001 and a commutation circuit 7002, and a photocoupler 7003 is provided for electrical insulation. Output from photocoupler 7003 is transmitted to internal bus b7 through input buffer 7004. A photo-diode 7005 indicates an operative condition.

A card ID portion 7006 and a bus interface 7007 are provided. With the operation thus organized, input card 7000 receives therein an external AC voltage state signal and transmits the signal to the sequence control portion 421. Instead of the AC input mode, a DC input mode is also available in the example of FIG. 22 without any substantial difference.

FIG. 23 shows a sequence output card 8000 which is a transistor output circuit. The status from internal bus b7 is temporarily held in an input buffer 8001 at 16 point operation points, and the status output signal is transmitted to the output side circuit through a driver 8002. Driver 8002 is operated by a clock generator 8003, and causes the transistor Trl to be ON or OFF through an insulation transformer. The ON-OFF output of transistor Trl is transmitted to various sequence elements disposed in the manufacturing line.

In FIG. 23, the transistor circuit is used as an output side circuit. However, other than the example, a relay circuit and a status output circuit may be used.

The hybrid type line controller 43 shown in FIG. 13(C) is a combination of controller 41 and controller 42. The ordinary input-output portion 414 and the sequence input-output portion 422 can be installed using a maximum number of 7 pieces and 8 pieces of cards respectively. The hybrid line controller 43 provides functions attendant to the ordinary line controller 41 and the sequence control line controller 42. Thus, a variety of line controls can be performed.

Line computer 10 is connected to ordinary line controller 41, sequence control line controller 42 or hybrid type line controller 43 as above described and obtained data is processed at the CPU board 101, and displayed at CRT, if needed.

The system of the invention is provided by the combination of a line controller which receives various input signals from the manufacturing line and outputs control signals, and a line computer which collects data from the line controller and performs high speed processing with use of specific memory access methods. Thus, the system of the invention provides automation at the site of the manufacturing line, provides power savings, accomplishes stabilized manufacture at high product quality, improves operability, and enables efficient small scale manufacture of many different products.

The foregoing is descriptive of the principles of the invention. Numerous modifications and extensions thereof would be apparent to the worker skilled in the art. All such modifications and extensions are to be considered to be within the spirit and scope of the invention.

What is claimed is:

1. In a manufacturing line control system comprising a line controller which performs various processing to products passing through a manufacturing line, and a line computer which conducts data processing from the line controller and send instructions thereto, the improvement comprising said line controller comprising an input portion which receives signals indicative of information as to said products passing through said manufacturing line and transmitted from various equipment installed on said manufacturing line; an output portion which supplies control signals to said various equipment; and a transmission interface for communicating with one of a host line computer and other line controllers; and said line computer comprising a microprocessor; a first bus connected to said microprocessor; a main memory consisting of a DRAM, a SRAM and a EPROM, said main memory being connected to said first bus and subjected to access by said microprocessor; a second bus whose bit number is smaller than that of said first bus; a bit number converting interface for controlling operation timing and connected between said first and second buses; a keyboard connected to said second bus through an interface; a back plane bus connected to said second bus through a bus interface; a CRT display device; a display control means connected to said back plane bus for controlling said CRT display device; and a bus interface connected to said back plane bus and performing transmission relative to said line controller.

2. The system of claim 1, wherein said EPROM has stored therein a start edge program;wherein said microprocessor has a stack segment indexed to said SRAM; and said microprocessor has a program segment and a data segment indexed to said DRAM.

3. The system of claim 1, wherein said first bus comprises a 32 bit type bus; and said second bus comprises a 16 bit type bus.

4. The control system of claim 1, wherein said display control means comprises a graphic image control portion having a frame buffer for controlling graphic image; a character image control portion having a character generator for controlling character image; and a signal converting portion for performing parallel-serial conversion of a signal from one of said graphic image control portion and said character image control portion.

5. The system of claim 1, wherein said line computer comprises a bus arbiter for determining a bus master occupying therein one of said first and second bus; and a priority register for reading out and writing from a plurality of bus masters connected to one of said first and second buses.

6. The system of claim 1, wherein said line controller comprises an internal bus and an ordinary input-output portion adapted to input and output one of analog signals and digital signals relative to said various equipment.

7. The system of claim 1, wherein said line controller comprises a sequence input-output portion for receiving a sequence element disposed on said manufacturing line and a signal; and a sequence control portion for receiving a signal from said sequence input-output portions and for performing sequence control according to a sequence table defining a processing order of sequence control.

8. The system of claim 6, wherein said ordinary input-output portion comprises a local input-output card which comprises an interface for receiving a signal from a transmission line; a signal converting portion for converting input signals to CRT display signals; and a microprocessor for controlling transmission relative to the display control means and said internal bus of said line controller.

9. The system of claim 6, wherein said ordinary input-output portion comprises a GP-IB input-output card which comprises a connector connected to a GP-IB transmission line; GP-IB control portion; and a microprocessor for communicating signals relative to said GP-IB control portion and for controlling communication with said internal bus of said line controller.

10. The system of claim 6, wherein said ordinary input-output portion comprises an input multiplexer for selecting and receiving several analog voltage signal from an industrial signal converter; a digital signal converting portion for converting inputted voltage to a digital signal; an output portion for outputting the digital signal into said internal bus of said line controller; an analog signal converting portion for converting control signals provided from said internal bus of said line controller to analog signals; and an output multiplexer for outputting said analog signals to a predetermined point.

11. The system of claim 6, wherein said ordinary input-output portion comprises a pulse counter for receiving several pulse row from an industrial signal converter; a data selector for selecting several points of pulse counter; and a bus interface in said line controller.

12. The system of claim 6, wherein said ordinary input-output portion comprises a status input-output card, said status input-output card comprising a status input portion for receiving several points of status signals from an industrial signal relay unit; a selecting portion for selecting several points of said status input portion; an output portion for outputting obtained status signal to said internal bus of said line controller; and a status output portion for outputting the status signal supplied from said internal bus of said line controller to a corresponding outputting point.

13. The system of claim 7, wherein said sequence input-output portion comprises a sequence input card, said sequence input card comprising an input portion for receiving a plurality of external voltage signals; a photo-coupler electrically insulated from outside for converting the voltage signals into ON-OFF signals; and a signal transmitting portion for transmitting signals from said photo-coupler to said internal bus of said line controller.

14. The system of claim 7, wherein said sequence input-output portion comprises a sequence output portion which comprises an input buffer for holding the status signal from said internal bus of said line controller; and an output portion for outputting ON-OFF signals to an instructed point, said ON-OFF signals corresponding to the signals held in said input buffer.

15. In a manufacturing line control system comprising a line controller which performs various processing to products passing through a manufacturing line, and a line computer which conducts data processing from said line controller and send instructions thereto, the improvement comprising said line controller comprising an input portion which receives signals indicative of information as to said products passing through said manufacturing line and transmitted from various equipment installed in said manufacturing line; an output portion which supplies control signals to said various equipment; and a transmission interface for communicating with one of a host line computer and other line controllers; and said line computer comprising a microprocessor; a main memory which is subjected to access by said microprocessor; a CRT display device; a display control means for controlling said CRT display device; and a keyboard input means; wherein said main memory comprises an EPROM including starting edge program; a SRAM for stack segment of the microprocessor; and a DRAM in which stored information is subjected to page control, said DRAM being physically allotted with a data segment and a program segment, said data segment storing therein an intermediary language as a machine language routine with respect to a plurality of basic user task program inputted externally, and said program segment storing therein a machine language and a basic interpreter functioning portion to which the microprocessor refers; and wherein said line computer further comprising an access control portion, said access control portion comprising a page memory means for holding page information which is previously subjected to access in the data segment and the program segment through the microprocessor; a comparator for comparing row address given by a present cycle from said microprocessor with said page information; and a DRAM controller for performing access by a column address when a coincident signal is outputted from said comparator, and for controlling page change when a non-coincident signal is outputted from said comparator.

16. The system of claim 15, wherein said DRAM controller comprises means for issuing signals to start refreshing operation, and for restarting access in accordance with page information held in said page memory means upon termination of said refreshing operation.

* * * * *